Oct. 21, 1930.  R. R. BLOSS ET AL  1,779,366
SPELTER REMOVING APPARATUS
Filed June 5, 1926   2 Sheets-Sheet 1

Richard R. Bloss
Robert C. Steffen
Sylvester B. Creamer
INVENTOR.

BY
ATTORNEYS.

Oct. 21, 1930.  R. R. BLOSS ET AL  1,779,366
SPELTER REMOVING APPARATUS
Filed June 5, 1926   2 Sheets-Sheet 2

Richard R. Bloss
Robert C. Steffen
Sylvester B. Creamer
INVENTOR.

BY
ATTORNEYS.

Patented Oct. 21, 1930

1,779,366

UNITED STATES PATENT OFFICE

RICHARD R. BLOSS, ROBERT C. STEFFEN, AND SYLVESTER B. CREAMER, OF COLUMBUS, OHIO, ASSIGNORS TO THE INTERNATIONAL DERRICK & EQUIPMENT COMPANY, OF COLUMBUS, OHIO, A CORPORATION OF OHIO

SPELTER-REMOVING APPARATUS

Application filed June 5, 1926. Serial No. 113,989.

Our invention relates to spelter removing apparatus. It has to do with the provision of a simple mechanism for receiving nuts, bolts and similar articles which have been galvanized by "hot dipping."

It is well known that the spelter or other galvanizing fluid has a tendency to harden into lumps on the articles that have been subjected to the "hot dipping" process to an undesirable extent and with undesirable rapidity. Frequently, these lumps gather on the threads of nuts and bolts or in the crevices of other articles to such an extent that the spelter or other fluid is not only wasted but the future utility of the article is impaired.

Other attempts have been made to remove this spelter or other excess fluid. Some of these attempts have taken the form of apparatus for subjecting the articles to centrifugal action. Other attempts have been directed to the provision of means for agitating the articles by vibratory action to effect removal of the spelter or other excess fluid.

Our invention aims to provide an apparatus which will remove the excess fluid by centrifugal action and with a minimum of wear and tear on the apparatus utilized to accomplish this result. It may take several forms but an important element of it is the provision of an article-containing basket which is suspended from a rotating spindle. This spindle is, preferably, provided upon its lower end with a hook element intended to receive the bail of the basket.

Our apparatus contemplates the provision of a driving pulley for the spindle which may be clutched to or declutched from the spindle to effect rotation or release thereof. It also comprises a brake structure to facilitate the stopping of the rotating spindle and the basket without delay.

The preferred embodiments of our invention are shown in the accompanying drawings wherein similar characters of reference designate corresponding parts and wherein Figure 1 is a side elevation of our apparatus, with portions thereof broken away to show a part of our article-containing basket in section.

Figure 1:
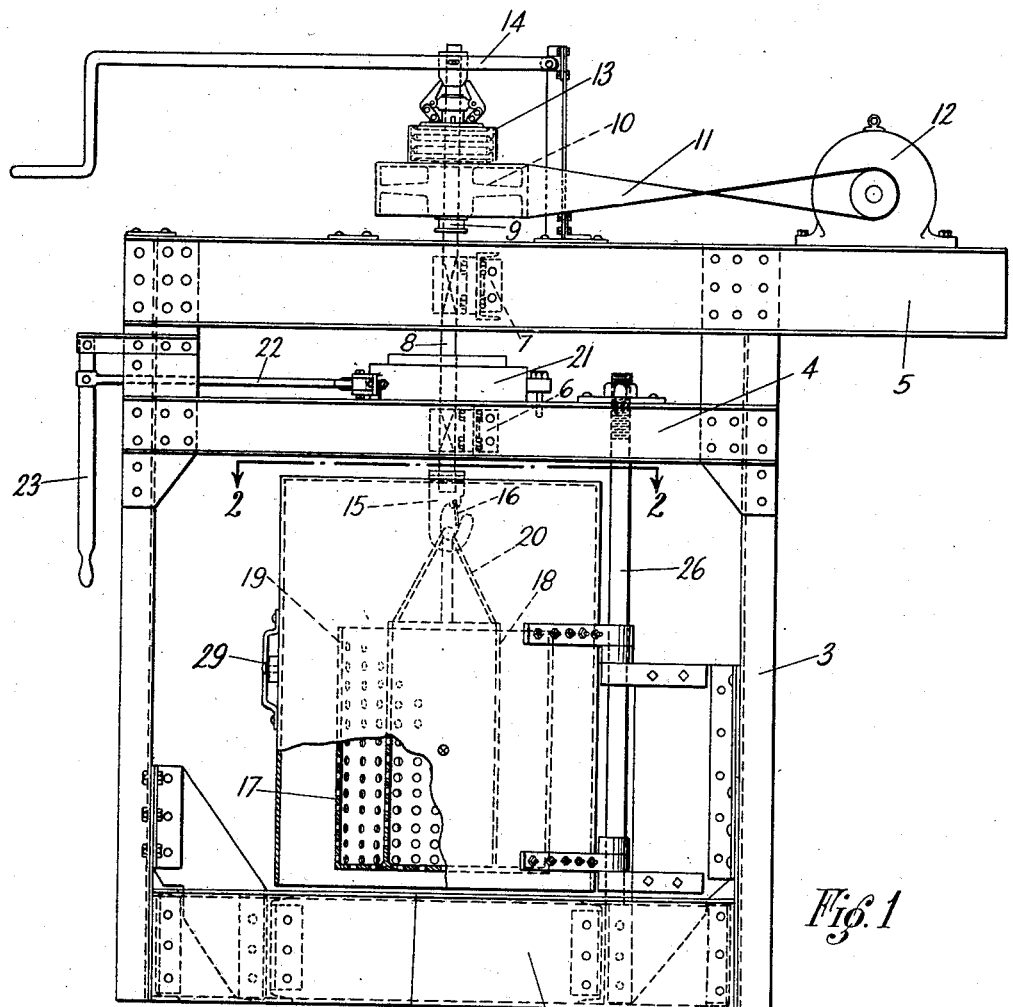
Figure 2:
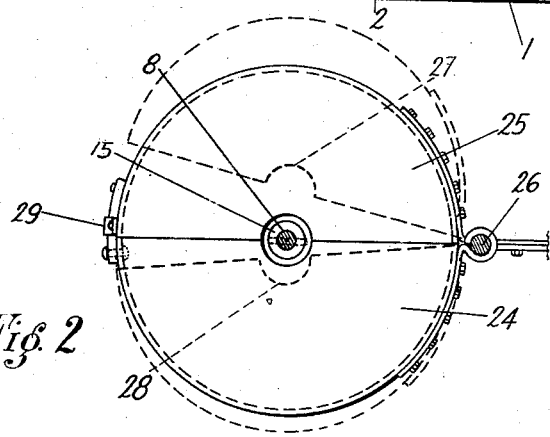
Figure 2 is a section taken on line 2—2 of Figure 1, illustrating the partible casing which surrounds our basket during its rotation.

In the drawings, with particular reference to Figures 1 and 2, our apparatus is shown as comprising a base structure 1 having a base plate 2 and a plurality of vertical standards 3. These vertical standards 3 support cross pieces 4 and cross pieces 5 which carry journals 6 and 7 for our rotatable spindle 8.

Adjacent its upper end, this rotatable spindle 8 is provided with a flange 9 and with an idle pulley 10 which is supported by the flange 9. The idle pulley 10 is designed to be driven by a belt 11 operated continuously from a motor 12 during the periods when the apparatus as a whole is being used. This idle pulley 10 is clutched to the spindle 8 whenever desired and for any desired period of time by a clutch structure 13 under the control of a hand lever 14.

Mounted upon the lower end of the spindle 8 is a hook 15 having a flap closure 16. This hook 15 is loosely mounted upon the spindle 8 in order to ensure sufficient freedom of movement between the rigid parts of the apparatus and the hook carrying the basket laden with the articles being treated.

The basket which we preferably utilize is designated 17 and comprises an inner annular wall 18 of perforate material. Its outer annular wall 19 is also of perforate material. It is provided with a bail structure 20 which fits over the hook 15 and is normally retained against accidental displacement therefrom by the flap retainer 16.

Intermediate its journals 6 and 7, the spindle 8 is provided with a band brake structure 21 having a leverage mechanism 22 designed to be operated by the hand lever 23. It will be readily understood that this brake structure is ineffective during the treatment of the articles and that during such treatment the spindle 8 is rotated at any desired speed by clutching the pulley 10 to this spindle by means of the clutch mechanism 13.

In conjunction with this mechanism, we have provided a partible casing member embodying units 24 and 25 which are hinged to the vertical shaft 26 extending between the base 1 and the cross piece 4.

This casing, when its partible units are closed, is of cylindrical form and extends down into close proximity with the plate 2 of the base 1. It is open at its base so that the spelter or other excess fluid may find its way down onto said base plate. It is closed at its upper end with the exception of semi-circular cut out portions 27 and 28 that are sufficiently large to permit free lateral play of the spindle 8 during the treating operation. The partible members 24 and 25 are held in closed relation by means of a latch structure 29.

Figure 3:
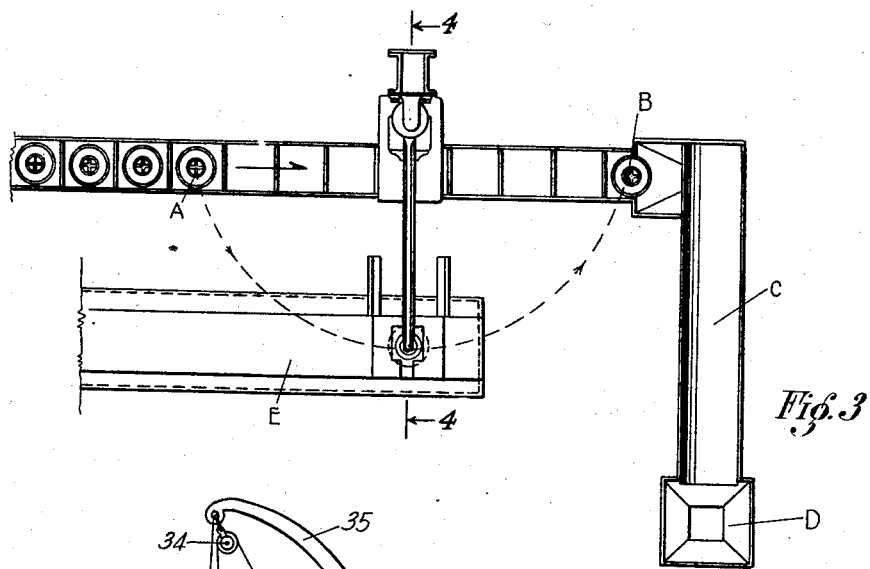
Figure 3 is a diagrammatic showing of a method for effecting "hot dipping" of articles to be galvanized, spinning such articles to remove the excess fluid and depositing the finished articles.
Figure 4:
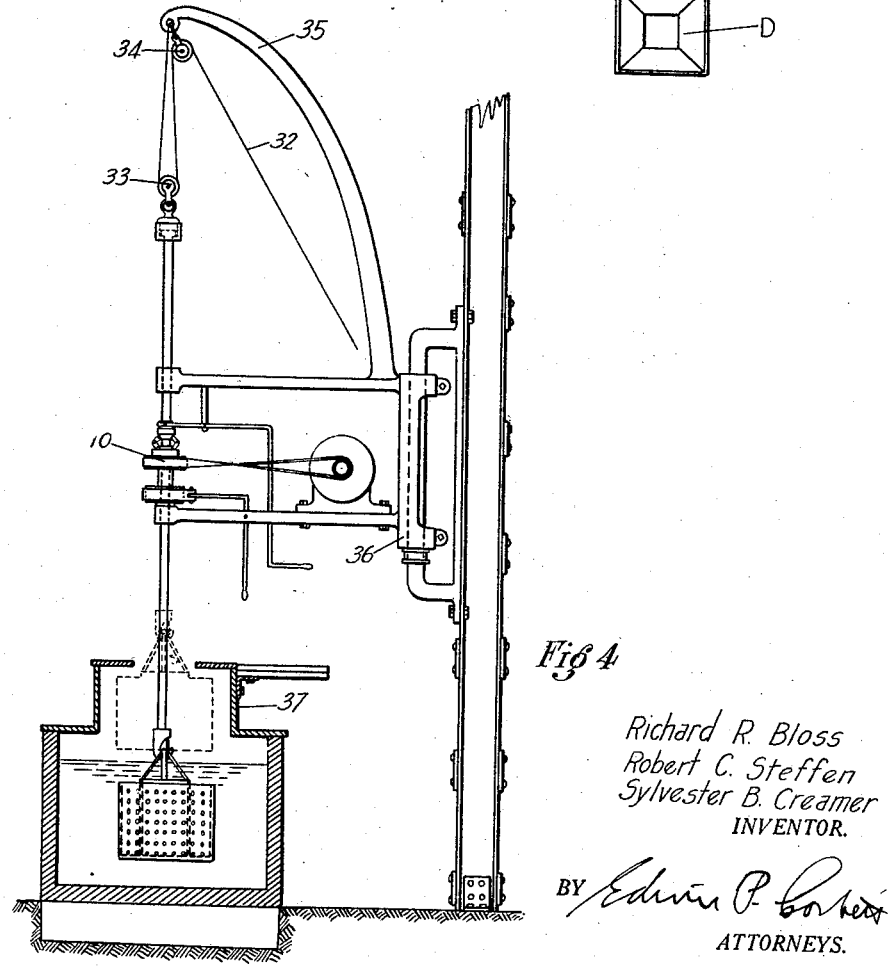
Figure 4 is a side elevation of a dipping and spinning structure embodying the major features of the apparatus shown in Figures 1 and 2 together with certain modifications and supplementary features as would serve to render this apparatus more completely applicable to the method shown in Figure 3.

Figures 3 and 4 illustrate a modified form of apparatus which is made possible by the novel principles of our apparatus for removing the excess fluid from the galvanized articles. In the first place, it will be apparent that our idea of using a suspended spinning basket makes it possible to utilize this suspending apparatus as a means for dipping the articles into the galvanizing fluid as well as for spinning these articles to remove the excess of such fluid. Furthermore, these steps fit naturally into a simple and efficient method for treating these articles by a continuous series of steps from the time they leave the pickling bath until they are delivered in finished condition to a storage room, all of which may be accomplished automatically.

Thus, after the pickling process is completed, the articles may be transferred automatically or otherwise into a series of baskets of the type shown in Figures 1 and 2. Such a series of baskets are shown in Figure 3 as being mounted upon an endless conveyer 30 which successively feeds these baskets to a point A. At this point A, the handle of the basket is placed upon the hook 15 of the spindle 8, either automatically or manually.

In the form of apparatus shown in Figures 3 and 4, the spindle 8 is vertically slidable on its journals and is provided upon its upper end with a swivel 31 that is connected by means of a hoist rope 32 and suitable pulleys 33 and 34 to a pivoted bracket 35. This bracket 35 is pivoted as at 36 in such a position that its outer and upper end is capable of a lateral and arcuate movement from the point A where it receives the spinning basket full of articles to a point B where the basket is tilted either automatically or manually to discharge its contents upon a delivery track or trough C leading to a storage room D for the finished articles.

At the time each basket is received by the hook 15 of the spindle 8, this spindle is preferably in such a position of elevation that the basket is above the level of the top of the galvanizing kettle E. It is also at one side of this galvanizing kettle, as shown in Figure 3. Immediately upon receipt, the member 35 is swung upon its pivot until the basket is directly over the galvanizing kettle and within the confines of a metal guard 37 that may be partible as in the structure shown in Figure 2 and that may also be closed either automatically or manually by the movement of the spindle carrying basket into position above the galvanizing kettle.

As soon as this basket is in proper position above the galvanizing kettle, the hoist rope 32 is manipulated either automatically or manually to bring about immersion of the basket of articles in the bath of galvanizing fluid. After this immersion has been satisfactorily accomplished, the hoist rope 32 is again manipulated, either automatically or manually, to raise the basket above the level of the galvanizing bath and into the confines of the metal guard 37. When in this position, the pulley 10 is clutched to the spinning shaft 8 as the spinning of the basket causes a removal of the surface galvanizing fluid from the articles within the basket. As soon as this is accomplished, the metal guard 37 is opened upon its opposite side, either automatically or manually, and the basket is swung to position B. At this position, the basket is dumped, either automatically or manually, so as to deliver the finished articles upon the trough or track C, whence they travel by gravity or otherwise to the storage room D.

The spinning of the articles above the bath of hot metal and within a hood, such as the metal guard 37, thereover produces certain distinct advantages. In the first place, the time period between removal from the bath and commencement of spinning is greatly decreased. Likewise, this spinning is effected under subjection to the currents of hot air moving upwardly from this hot metal bath and this serves to simplify the removal of the excess material in that it both minimizes the time period required for spinning and the degree of centrifugal force necessary to remove the surface material.

Another important aspect of our invention resides in the fact that the loose or articulated connection between the baskets and the hook on the spindle enables the center of gravity of the basket with its contents to swing into line with the axis of rotation of the spindle so that the axis of rotation of the spindle and the axis of rotation of the basket with its contents are a substantially common axis which passes automatically through the center of gravity of the rotating mass. For instance, the center of gravity of the basket with its contents is approximately at the point indicated in Figure 1 as X and the pull of gravity will serve to hold this mass in a vertical position suspended beneath the hook. This is one of the important advantages of supporting the basket by suspension, inasmuch as it obviously results in a stable structure which is free from any tendency of the basket to tip over. With this suspension principle, if the center of gravity of the basket and its contents, when being suspended from the hook, does not lie on the projected axis of the spindle when the basket is stationary, the combined action of centrifugal force, gravity and the gyroscopic action of the device will tend to pull the center of gravity of the whirling basket into alignment with the center of rotation under the stresses developed when rotated.

This principle of supporting by suspension makes possible the effective removal of excess galvanizing fluid with a minimum of vibration of the apparatus utilized. Thus, there is ensured a smooth operation and maximum longevity of the apparatus.

Another important aspect of our invention arises from the fact that our suspending spindle can be utilized for dipping of the basket of articles in the galvanizing bath and removal from such bath without detaching such basket from its hook during such dipping and removal and during spinning. Likewise, this mechanism greatly facilitates the provision of a mechanism for receiving the basket of articles, transferring it to the bath of galvanizing material, removing it from this bath, spinning to remove the excess fluid and dumping the finished product onto a means for delivering such finished articles into a storage compartment. Various other obvious advantages flow from the construction described.

A still further important feature of our invention arises from the fact that we have provided a receptacle of such construction that the material to be galvanized will be confined to a space within the receptacle that is substantially removed from the center of the receptacle. In other words, the material to be galvanized will be confined to the greater circumferences of the receptacle. It is well known that the further removed the articles are from the center of rotation, the greater the centrifugal action on the articles will be. Thus, with the articles confined to the greater circumference of the receptacle, they will be subjected to a greater centrifugal action than they would be if not confined to such part of the receptacle.

Having thus described our invention, what we claim is:

1. Apparatus for galvanizing comprising a tank containing galvanizing material, a supporting framework, a driven shaft, a receptacle capable of swinging for containing the articles to be galvanized suspended from the lower end of said shaft, means for raising and lowering said receptacle into and out of said tank, a rotatable driving element, means for clutching said driving element to said driven shaft, a brake drum on said driven shaft, a brake band for cooperating with said drum, and leverage mechanism for operating said brake band.

2. Apparatus for galvanizing comprising a tank containing galvanizing material, a supporting framework, a driven shaft, a hook mounted on the lower end of said shaft and independently movable with relation thereto, a receptacle capable of swinging for containing the articles to be galvanized suspended from said hook, means for raising and lowering said receptacle into and out of said tank, a normally rotating driving element in cooperative relation with said shaft, means for clutching said driving element to said driven shaft, and a brake for operating upon said driven shaft.

3. Apparatus for galvanizing comprising a tank containing galvanizing material, a supporting frame, a driven shaft, a receptacle for containing articles to be galvanized suspended from the lower end of said shaft and having a loop upon its upper end, means for raising and lowering said receptacle into and out of said tank, a rotatable driving element, means for clutching said driving element to said driven shaft, a brake for operating upon said driven shaft, and a hook member for passing through said loop to effect suspension of said receptacle, said hook being independently movable with relation to said shaft and having a latch to prevent accidental release of said loop therefrom.

4. Apparatus for galvanizing comprising a supporting framework, a driven shaft, a swinging receptacle for containing the articles to be galvanized suspended from the lower end of said shaft, a rotatable driving element, means for clutching said driving element to said driven shaft, and a brake for operating upon said driven shaft.

In testimony whereof we hereby affix our signatures.

RICHARD R. BLOSS.
ROBERT C. STEFFEN.
SYLVESTER B. CREAMER.